United States Patent [19]

Berisch

[11] 4,331,363
[45] May 25, 1982

[54] BRAKE PRESSURE CONTROL UNIT FOR VEHICLE BRAKE SYSTEMS

[75] Inventor: Volker Berisch, Hattersheim, Fed. Rep. of Germany

[73] Assignee: ITT Industries, Inc., New York, N.Y.

[21] Appl. No.: 155,826

[22] Filed: Jun. 2, 1980

[30] Foreign Application Priority Data

Jun. 30, 1979 [DE] Fed. Rep. of Germany ....... 2926499

[51] Int. Cl.³ .............................................. B60T 8/26
[52] U.S. Cl. .................................................. 303/6 C
[58] Field of Search ............. 188/349; 303/6 C, 22 R

[56] References Cited

U.S. PATENT DOCUMENTS

| | | | |
|---|---|---|---|
| 3,795,424 | 3/1974 | Lewis | 303/6 C |
| 3,945,686 | 3/1976 | Orzel | 303/6 C |
| 4,170,386 | 10/1979 | Shutt | 303/6 C |

Primary Examiner—Duane A. Reger
Attorney, Agent, or Firm—John T. O'Halloran; Alfred C. Hill

[57] ABSTRACT

The control valve is disposed between the master cylinder and the wheel cylinder for controlling the brake pressure. The control valve comprises a differential piston which has a control force applied thereto and a valve which is controlled dependent on the movement of the differential piston. To achieve a very simple construction and a great variation of different control valve types employing largely identical elements, the control valve of the present invention includes a sleeve inserted into the housing bore and a screw-in cap to close the housing bore. Associated with the sleeve and the screw-in cap are spacer members to keep the sleeve in place. The differential piston is a stepped piston having an axial pressure medium channel with the end of this channel in the smaller diameter portion of the stepped piston cooperating with a valve closing member to provide the regulating valve. The smaller diameter portion of the stepped piston is guided in the sleeve and the larger diameter portion of the stepped piston is guided in a coaxial bore of the screw-in cap.

10 Claims, 5 Drawing Figures

BRAKE PRESSURE CONTROL UNIT FOR VEHICLE BRAKE SYSTEMS

BACKGROUND OF THE INVENTION

The present invention relates to a brake pressure control unit for vehicle brake systems which is hydraulically interposed in the fluid line between a master cylinder and at least one wheel brake cylinder and comprises at least one stepped piston acted upon by the force of a control spring and a valve actuatable dependent on the displacement of the stepped piston, with the closure member of the valve being resiliently supported.

SUMMARY OF THE INVENTION

An object of the invention is to provide a control valve of the aforementioned type which is of simple construction and affords ease of assembly compared to known valves of this type and which further requires little space and is capable of being incorporated into a modular construction.

A feature of the present invention is the provision of a brake pressure control unit for vehicle brake systems which is hydraulically interposed in a fluid line between a master cylinder and at least one wheel brake cylinder comprising: a housing having a stepped housing bore coaxial of a longitudinal axis; at least one stepped piston disposed in the housing bore coaxial of the axis acted upon by the force of a control spring and including an axial passageway therein communicating with the master cylinder and the brake cylinder; a sleeve disposed in the housing bore coaxial of the axis abutting on a step in the housing bore and guiding the smaller diameter portion of the stepped piston; a screw-in cap coaxial of the axis closing the housing bore and having a coaxial bore therein guiding the large diameter portion of the stepped piston; spacing means disposed in the housing bore coaxial of the axis between the cap and the sleeve; and a valve including a valve edge disposed at the end of the passageway in the smaller diameter portion of the stepped piston and a valve closure member disposed coaxially of the axis and spaced from the end of the passageway in the smaller diameter portion of the stepped piston.

Such a valve permits a very compact structure and is therefore particularly suitable for incorporation into a modular construction.

In an advantageous embodiment, the control spring is arranged coaxially around the stepped piston, bearing with one end against a radial extension of the stepped piston and with its other end against the sleeve. The valve closure member is preferably connected to a feeler piston acted upon by the non-regulated pressures of two separate brake circuits.

In another advantageous embodiment, the housing of the brake pressure control unit forms part of a master cylinder housing. In still another advantageous embodiment, the housing has at its end close to the valve closure member a threaded stem with a coaxial inlet port. Thereby it adapts conveniently to a housing accomodating other functional components, as will be described hereinbelow with reference to a particular embodiment.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
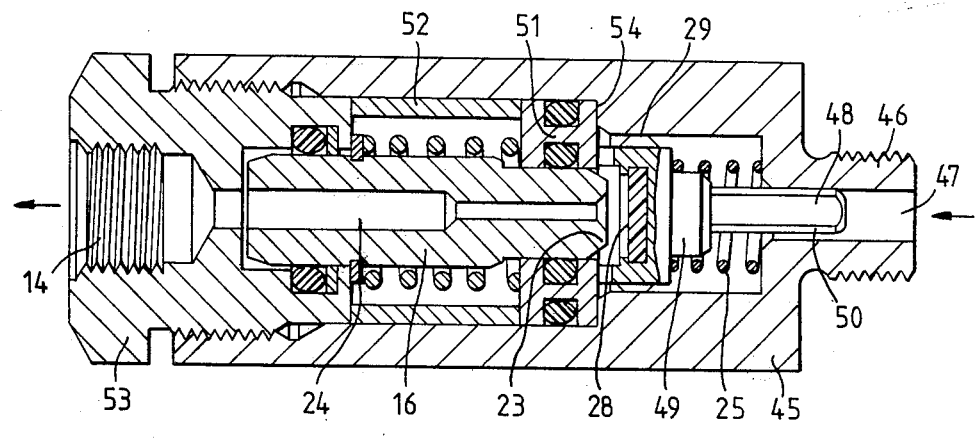
FIG. 1 is a longitudinal cross sectional view of a first embodiment of a brake pressure control unit in accordance with the principles of the present invention for use in a modular system and constructed as a screw-in cartridge.

The control unit of FIG. 1 has a rotationally symmetrical housing 45 which at its end opposite its outlet port 14 has the form of an externally threaded stem 46 enabling housing 45 to be screwed into another suitably constructed body or housing. Opening into the threaded bore provided to receive threaded stem 46 is the channel (55 in FIG. 5) which extends from the actuating pressure source (master cylinder) to be connected to an inlet port 47 by the insertion of the screw-in cartridge shown in FIG. 1. Located in this channel or port 47 lying on the axis of symmetry of housing 45 is the guide stem 48 of a valve seat body 49 which incidentally corresponds to valve seat body 17 dealt with further below with reference to the description of FIG. 3. The right-hand end 23 of a stepped piston 16, when viewing the drawing, is formed as an annular rib close to the sealing surface 28 of the body 49. Stem 48 fits into the longitudinal bore of port 47 so as to thereby guide body 49 in this bore in its longitudinal direction. At the same time, stem 48 has at its periphery longitudinally extending grooves or flattenings 50 and radial passageways between stops 29 to permit free flow of fluid into the chamber receiving valve seat body 49. The left-hand end of stepped piston 16 and thus its longitudinal channel 24 are connected to an outlet port 14 which is hydraulically connected to the rear-axle brake circuit.

The abutment surface 28 opposite sealing ring rib 23 is formed by a disc of elastic rubber material inserted into body 49.

As disclosed in FIG. 1, a ring or a sleeve 51, a spacer in the form of sleeve 52, the closure screw 53 and the radial abutment surface 54 integrated into the control unit contribute substantially to the compact and adaptive design.

Figure 3:
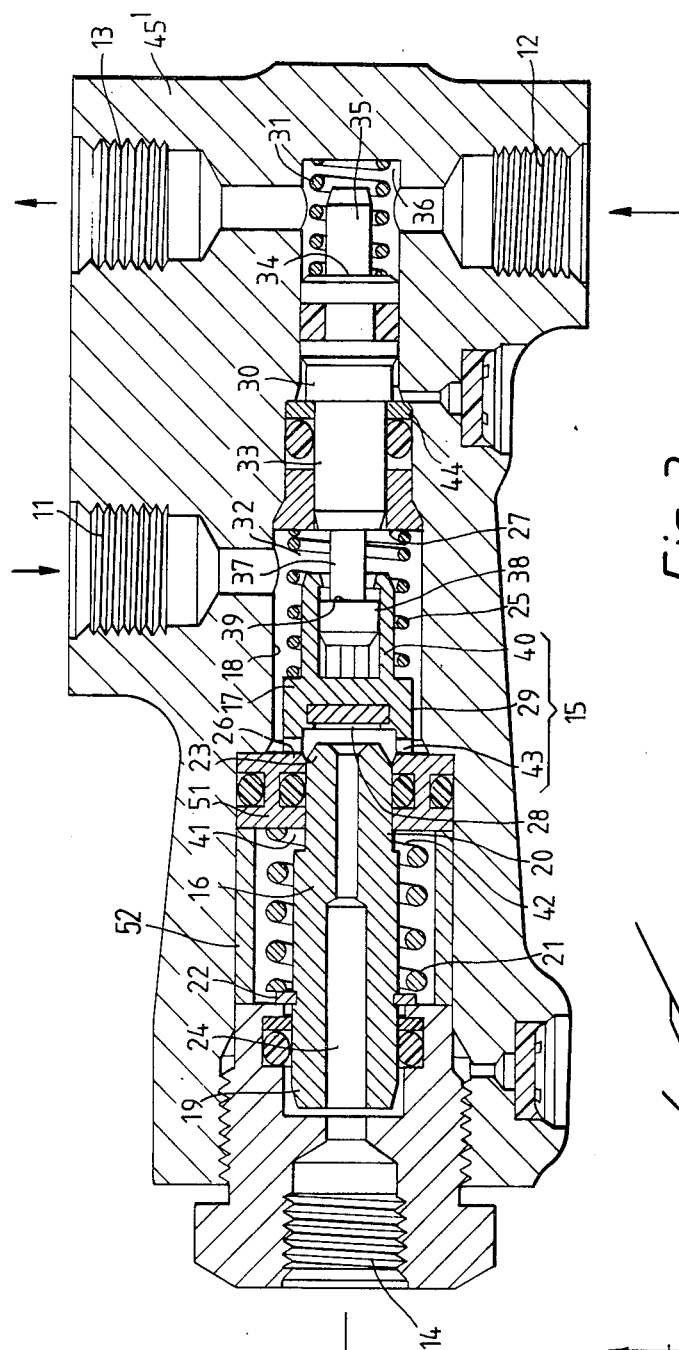
FIG. 3 is a longitudinal cross sectional view of a second embodiment of a brake pressure control unit in accordance with the principles of the present invention for use with a dual-circuit brake system and influencing the regulated circuit dependent upon the condition of the second circuit.

The control unit shown in FIG. 3, conventionally referred to as a regulator, has its movable parts in a housing 45' including ports 11 to 14. Of these, the ports and channels 13 and 14 are connected to the brake cylinders of the front axle and rear axle, respectively. A first pressure chamber of a tandem master cylinder is connected to port 12 and a second pressure chamber to port 11. Arranged between the master cylinder port 11 and its associated rear-axle port 14 is a control valve 15 whose closure member is designed as a stepped regulating or control piston 16 and whose valve seat 17 is a one-piece or multi-piece construction. Relevant details will become apparent from FIG. 3. According to FIG. 3, the two members 16 and 17 are in essence rotationally symmetrical bodies coaxially associated with each other and with the stepped bore 18 receiving them. In a known manner, seals, stops, screw plugs, circlips and bore sections of various diameters subdivide the bore or chamber into compartments to receive the individual parts. Piston 16 has a left-hand part 19 associated with the rear-axle outlet port 14, which has an outside diameter greater than in its right-hand part 20. A bore or channel 24 extends through piston 16 coaxially. FIG. 3 shows piston 16 in its left-hand end position into which it is urged by a helical compression spring 21. The right-hand end of spring 21 bears against an angular disc 41 which is considered to be part of the housing, and the left-hand end of spring 21 bears against a circlip 22 inserted into piston 16. In this arrangement, circlip 22 abuts with its left-hand end surface on the left-hand end surface of the spring chamber accomodating spring 21. The right-hand end 23 of piston 16 which is smaller in diameter than the left-hand piston part 19 is constructed as a sealing edge around the orifice of axial channel or passageway 24. This sealing edge is located opposite valve seat body 17 movable in housing 45' and cooperates with it—depending on the position—in order to throttle or shut off channel 24. At its outer periphery, valve seat body 17 is guided by the interior wall of bore 18 in an axial direction, but is not sealed thereto. In order to ensure the passage of fluid, grooves 29 are provided in the cylindrical outer surface of valve seat body 17 which extend in the direction of the cylindrical lateral surface of body 17. In addition, body 17 has at its end close to piston 16 projections 43 located on a radius outside the radius of the right-hand piston part 20, with spaces therebetween. Projections 43 and the associated spaces cooperate to permit abutment of projections 43 of body 17 with a radial stop surface 26 of sleeve 51 without thereby obstructing the free passage of fluid. Valve seat body 17 is urged into this stop position by a valve spring in the form of a helical compression spring 25, whose right-hand end bears against a radial stop surface 27. The inner part or sealing surface 28 of movable body 17 forms the seat for the sealing edge at piston end 23.

Arranged coaxially to the previously described members is a stepped feeler piston 30 disposed in that portion of bore 18 which crosses the passageway interposed between the two ports 12 and 13. Stepped feeler piston 30 has the force of a spring 31 always applied thereto in a manner tending to urge piston 30 to the left. Chamber 32 receiving valve seat body 17 always communicates with the inlet port 11 from the master cylinder. Close to chamber 32 is the smaller cross-sectional area of stepped piston 30 identified as piston part 33. The opposite end surface 34 of piston 30 is greater than that end surface upon which the pressure from chamber 32 acts. In addition to the force of spring 31, the pressure from channels 12 and 13 counteracts, due to the correspondingly larger end surface 34, the force applied as a result of the pressure in chamber 32. Movement of piston 30 to the right is limited by a rightward extending coaxial pin 35 which may abut against the end wall or the bottom 36 of bore 18. Movement of piston 30 to the left is limited by a step in piston 30 and a suitable ring 44, because when ring 44 is reached, the effective pressure-loaded surface of piston 30 close to chamber 32 is enlarged by the surface of ring 44. Thus, members 30, 17 and 16 are slidable in an axial direction. There is a drive-type connection or coupling between members 17 and 30. Axially extending from the end surface of part 33 of piston 30 is a neck 37 on which a head 38 of larger diameter is seated. Between neck 37 and head 38 is a step 39 which is engaged from behind by suitable countersteps at the end of axially rightwardly extending fingers 40 which project on a radius from the rear side of body 17 as a collar. For assembly, head 38, which is suitably beveled at its left-hand end surface, can be easily urged into the space between fingers 40 where it is held captive. The clearance of axial movement of head 38 in the cage formed by fingers 40 is determined by the axial distance between the barbed steps of fingers 40 and the right-hand end surface of body 17 relative to the axial extension of head 38 between its step 39 and its frontal end surface abutting in the middle of body 17.

The mode of operation of the control circuit illustrated in FIG. 3 is as follows. In the inactive position shown, the cavities in the housing, i.e., the chamber and inlet ports, are filled with unpressurized fluid. Practically, only the spring forces have effect as is shown, with all three movable members 16, 17 and 30 being in abutment with their left-hand stops. The dimensions are such that sealing edge 23 is not seated on its valve seat surface 28, so that there is a free passage between ports 11 and 14. In this arrangement, valve seat body 17 and stepped piston 30 are equally out of axial engagement. This condition will continue to exist as long as the product of the pressure in channels 12 and 13 by the cross-sectional area 34 plus the force exerted by spring 31 is greater than the product of the pressure in inlet port 11 by the cross-sectional area of piston part 33. Thus, if pressure is delivered into inlet ports 11 and 12 from the actuating or master cylinder for the purpose of actuating the brake, the above-named condition is satisfied and the position of piston 30 will remain unchanged.

The fluid from inlet port 11 is practically free to flow past body 17 to its left-hand end or sealing surface 28 and onwards into axial bore 24 of piston 16 through outlet port 14 to the rear-axle brake cylinders. The pressure developing in outlet port 14 will exert an increasing resultant force on stepped piston 16 as a result of the ratio between the areas of cross-section of piston parts 19 and 20, thereby causing piston movement to the right in opposition to the force of spring 21 and closing of fluid channel 24 as a result of the abutting engagement of the sealing edge at 23 with valve seat surface 28. With the pressure in the inlet port continuing to increase, the pressure increase occurring in the outlet port will be appropriately reduced in accordance with the surface ratio of stepped control piston 16.

Figure 4:
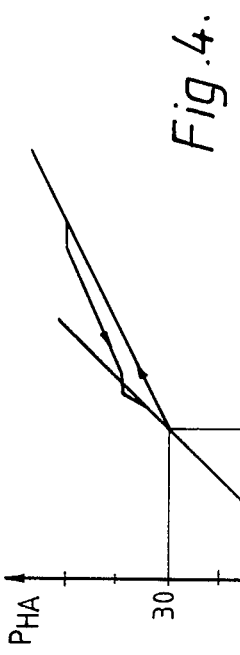
FIG. 4 is a graph showing the interdependences of the pressures in the two circuits of FIG. 3 in the presence of different conditions.

The graph of FIG. 4 illustrates the operation of FIG. 3. This graph shows that the brake pressure is initially equally distributed to the two axles. However, from a specific point changes in the sense of a reduced increase in the rear-axle brake pressure relative to the front-axle brake pressure occurs.

If the brake pressure in the front-axle brake circuit fails on receipt of an actuating pressure, for example, because of fracture of a brake pipe, ports 12 and 13 will become unpressurized and the pressure from the master cylinder at port 11 and in chamber 32, will urge piston 30 to the right in opposition to the force of spring 34. The same will happen if, instead of an unpressurization of the front-axle brake circuit, only a differential pressure occurs. In either case, the valve seat body 17 will be entrained to the right via the drive and drag coupling 38, 17, resulting in disengagement of valve seat surface 28 from the sealing edge at 23. The amount of displacement of stepped piston 16, which is determined by the axial distance between step 42 of piston 20 and its associated stop surface 41, is smaller than the space remaining between bottom 36 and the right-hand stop end at pin 35 of piston 30. Assuming that head 38 and the end hooks of fingers 40 are already in engagement, piston 30 will entrain valve seat body 17 by the distance between bottom 36 and pin 35 and will thereby cause disengagement of valve seat surface 28 from sealing edge 23 in any case, because piston 16 cannot follow this movement that far. Thereby, the throttle between ports 11 and 14 is immediately eliminated, permitting the full actuating pressure to be delivered to the rear-axle brake cylinders without delay.

Thus, the new arrangement is characterized with regard to its operation in that, with the control unit intact, the full and unthrottled actuating pressure is supplied to both brake circuits at the beginning of braking, and in that the pressure delivered to the one brake circuit, which in the case described is the rear-axle brake circuit, is throttled or reduced a little later on. If at any instance during this process, a failure in the other brake circuit 12 and 13, or an unpressurization and even a pressure reduction occurs, there will immediately result in a fully opened fluid channel 24 of the first brake circuit (e.g., the rear-axle brake circuit), irrespective of the cause.

If a braking operation is to be terminated with the brake circuits intact, which is accomplished by reducing the actuating pressure, valve spring 25 substantially determines the differential of pressures at outlet 14 and inlet 11 which is required for opening brake circuit 14, 24, because these pressures are practically opposed via the same surface, i.e., the surface enclosed by the sealing edge at 23 and seal 28. The desired pressure differential is achieved by suitably dimensioning spring 25. If the front-axle brake circuit 12, 13 is not equipped with a similar control valve, the two brake circuits are hydraulically asymmetrical, as can be seen in FIG. 4. In this Figure, the hydraulic pressure in the rear-axle brake circuit is plotted on the ordinate while the relevant pressure in the front-axle brake circuit is plotted on the abscissa. From the beginning of braking up to a specified pressure, the pressure increase in both brake circuits is equal. With continuing pressure increase, the pressure in the rear-axle circuit will increase to a lesser extent than in the front-axle circuit. When less braking force is applied, the rear-axle circuit will follow the front-axle circuit with a certain amount of delay, as shown in the graph.

Figure 2:
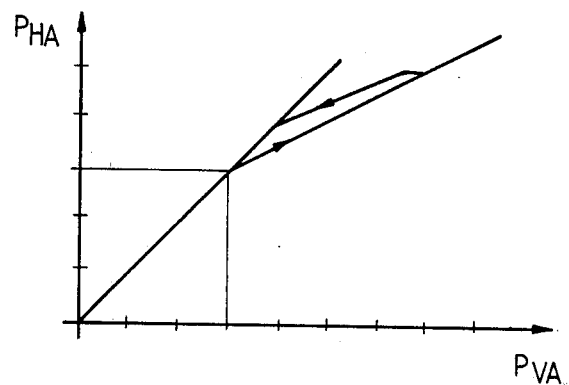
FIG. 2 is a graph showing the pressures in the unit of FIG. 1.

While the graph of FIG. 4 is associated with the arrangement of FIG. 3, the graph of FIG. 2 corresponds to the arrangement of FIG. 1 and shows the relationship between the pressures in the front-axle brake circuit (abscissa) and the rear-axle brake circuit (ordinate).

Figure 5:
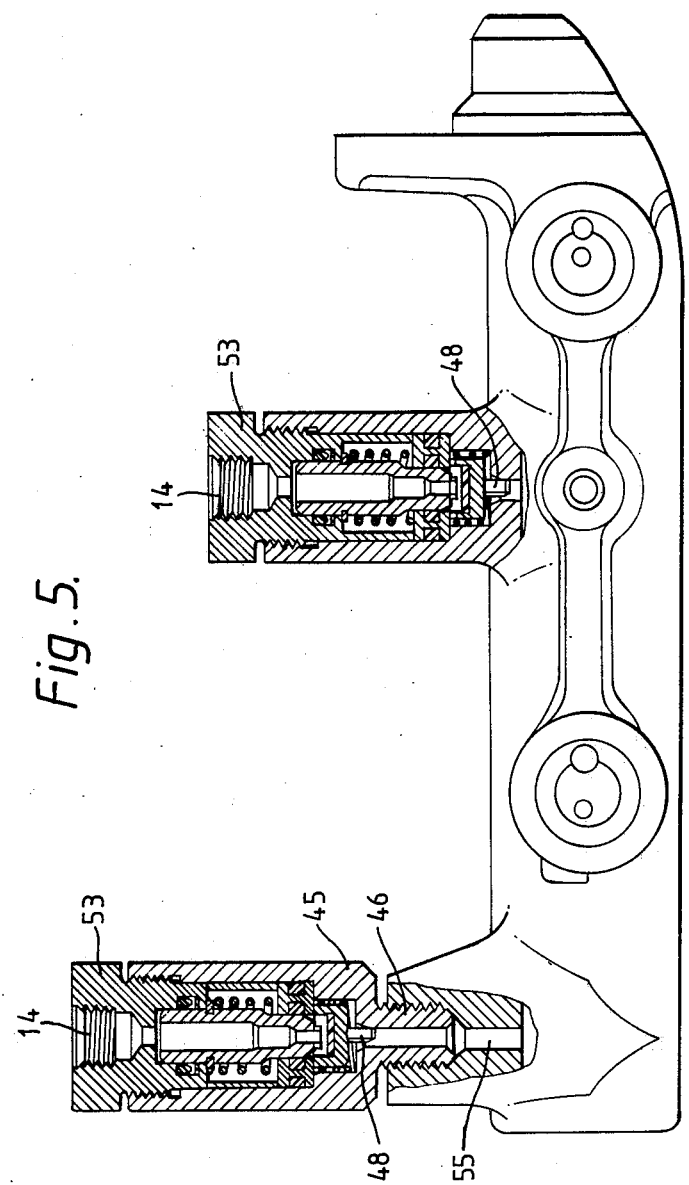
FIG. 5 is a view of a dual master brake cylinder having the screw-in cartridge control unit of FIG. 1 screwed into the left-hand end of the master brake cylinder housing when viewing the drawing, while in the right-hand part of the master brake cylinder housing the control unit is incorporated into the housing of the master cylinder.

The screw-in regulator which is screwed down into the left-hand end of the master cylinder shown in FIG. 5 corresponds in all details to the screw-in cartridge shown in FIG. 1. The threaded stem 46 is received by a suitable thread of the master cylinder housing. Like the hydraulic connection, this becomes apparent from the partial section illustrated. The second regulator, which is located farther to the right at the tandem master cylinder, is integrated into the cylinder such that the body corresponding to housing 45 of FIG. 1 is an integral part of the master cylinder housing. The mounting parts from stem 48 up to the threaded closure plug accommodating outlet port 14 are identical with those of the cartridge of FIG. 1.

Further embodiments of the arrangements hereinabove described are possible. Thus, the longitudinal grooves in stem 48 may be replaced by an axial longitudinal bore in the form of a blind-end bore which is open towards inlet port 47 and communicates with a crossbore close to the chamber receiving spring 25, thereby connecting this chamber to channel 47.

Substantially contributing to the compact construction are the use of a passageway of channel 24 through control piston 16, the construction of piston 16 as a stepped piston, and the use of a valve seat body or valve closure member which, being freely movable in the housing, is acted up by a compression spring.

As mentioned and shown by way of example, the new unit is particularly suitable for use with a modular system in which many like parts are adapted for use in various regulators which results in a cost advantage (high piece numbers, low stockholding costs). For example, if it is desired to assign a regulator another slope to its characteristic curve, only another stepped piston with another sleeve and/or closure screw has to be inserted.

It is another advantage of the regulator described that the housing bore need not become effective as a guide surface for the stepped piston, so that its surface need not be machined for such a guiding function.

The regulator of this invention and the modular system achievable with it are particularly suitable also for twin regulators where it is possible to vary the switch point of the valves in response to the load, i.e., dependent on the load condition of the vehicle.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake pressure control unit for vehicle brake systems which is hydraulically interposed in a fluid line between a master cylinder and at least one wheel brake cylinder comprising:
   a housing having a stepped housing bore coaxial of a longitudinal axis;
   at least one stepped piston disposed in said housing bore coaxial of said axis acted upon by the force of a control spring and including an axial passageway therein communicating with said master cylinder and said brake cylinder;
   a sleeve disposed in said housing bore coaxial of said axis abutting on a step in said housing bore and guiding the smaller diameter portion of said stepped piston;
   a screw-in cap coaxial of said axis closing said housing bore and having a coaxial bore therein guiding the large diameter portion of said stepped piston;

separate spacing means disposed in said housing bore coaxial of said axis between adjacent end surfaces of said cap and said sleeve; and a valve including a valve edge disposed at the end of said passageway in said smaller diameter portion of said stepped piston and a valve closure member disposed coaxially of said axis and spaced from said end of said passageway in said smaller diameter portion of said stepped piston.

2. A control unit according to claim 1, wherein said control spring is disposed about said stepped piston, one end of said control spring bearing against a radially outward extending projection on said larger diameter portion of said stepped piston and the other end of said control spring bearing against said sleeve.

3. A control unit according to claim 2, wherein said valve closure member is connected to a feeler piston disposed in said housing bore acted upon by unregulated pressure of two separate brake units.

4. A control unit according to claim 2, wherein said housing is part of a housing of said master cylinder.

5. A control unit according to claim 2, wherein said housing includes an externally threaded stem disposed on an end thereof adjacent said valve closure member, said threaded stem having a coaxial bore therein acting as an inlet port for said control unit.

6. A control unit according to claim 5, wherein said threaded stem is screwed into a threaded bore in a housing of said master cylinder.

7. A control unit according to claim 1, wherein said valve closure member is connected to a feeler piston disposed in said housing bore acted upon by unregulated pressure of two separate brake units.

8. A control unit according to claim 1, wherein said housing is part of a housing of said master cylinder.

9. A control circuit according to claim 1, wherein said housing includes an externally threaded stem disposed on an end thereof adjacent said valve closure member, said threaded stem having a coaxial bore therein acting as an inlet port for said control unit.

10. A control circuit according to claim 9, wherein said threaded stem is screwed into a threaded bore in a housing of said master cylinder.

* * * * *